(No Model.) 3 Sheets—Sheet 1.
W. A. LEE.
DISK HARROW WITH GRAIN DRILL ATTACHMENT.
No. 535,544. Patented Mar. 12, 1895.
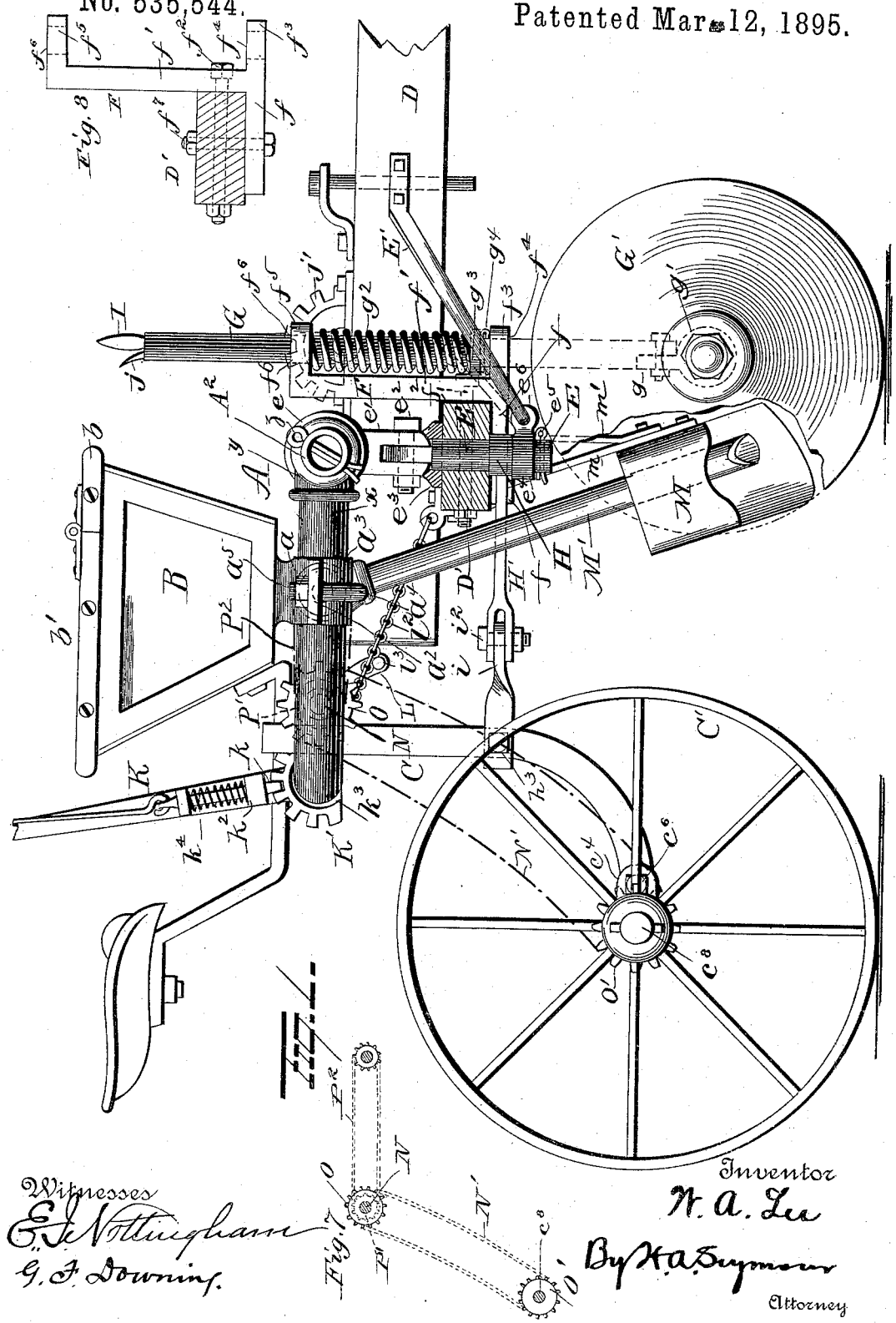
Witnesses
E. L. Nottingham
G. F. Downing
Inventor
W. A. Lee
By H. A. Seymour
Attorney

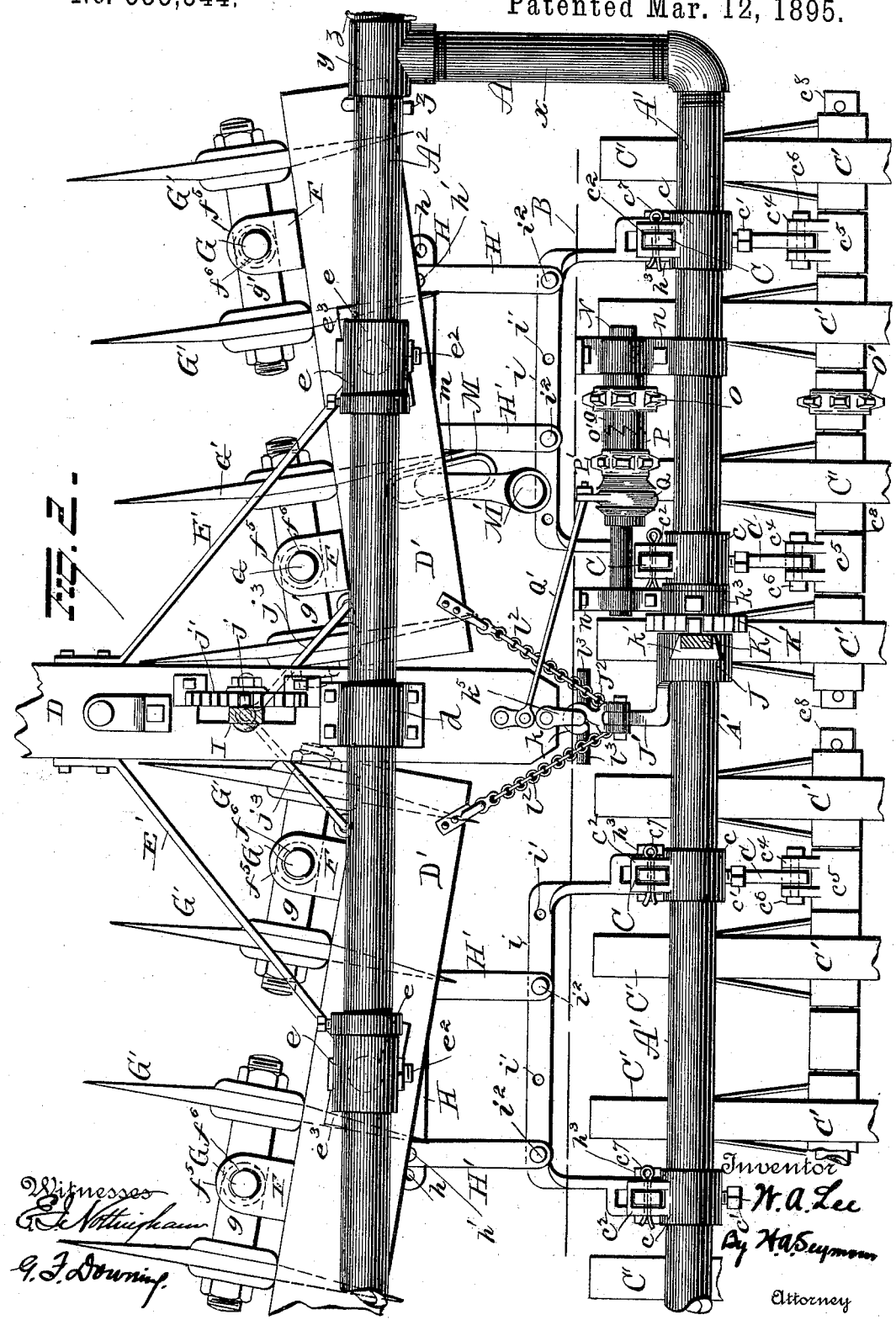

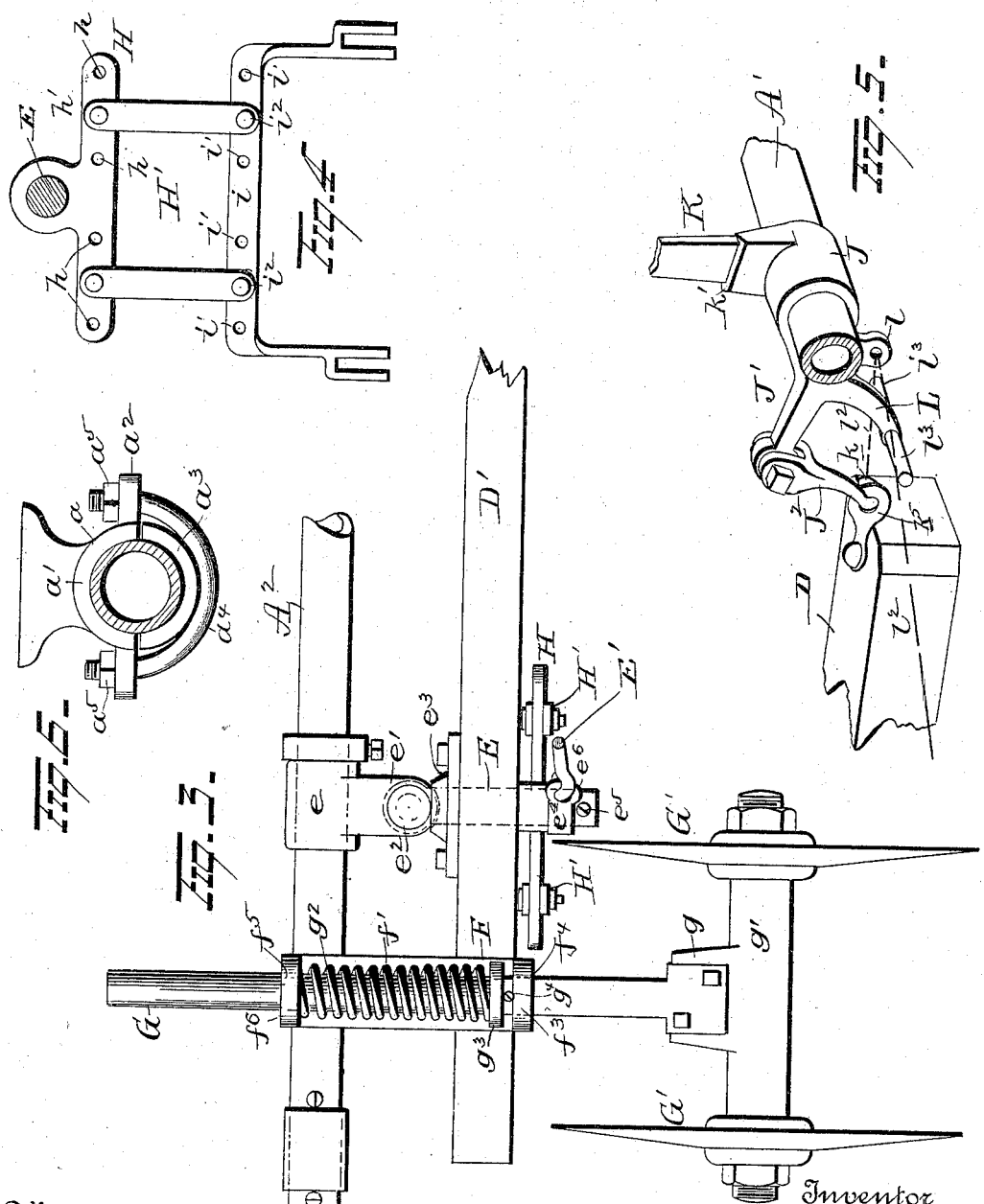

UNITED STATES PATENT OFFICE.

WILLIAM A. LEE, OF WINFIELD, KANSAS, ASSIGNOR OF ONE-HALF TO HENRY F. BURKET, OF SAME PLACE.

DISK HARROW WITH GRAIN-DRILL ATTACHMENT.

SPECIFICATION forming part of Letters Patent No. 535,544, dated March 12, 1895.

Application filed April 15, 1893. Renewed January 11, 1895. Serial No. 534,591. (No model.)

*To all whom it may concern:*

Be it known that I, WILLIAM A. LEE, of Winfield, in the county of Cowley and State of Kansas, have invented certain new and useful Improvements in Disk Harrows with Grain-Drill Attachments; and I do hereby declare the following to be a full, clear, and exact description of the invention, such as will enable others skilled in the art to which it appertains to make and use the same.

My invention relates to an improvement in combined grain drills and harrows,—the object of the invention being to construct a combined grain drill and disk harrow in such manner that the machine can be easily and quickly adapted to act either as a grain drill or a disk harrow.

A further object is to provide improved draft devices for a machine of the class specified and to so construct and arrange such devices that the press wheels will be made to properly follow in the line of travel of the furrow disks and so that the various parts will have a free movement and not liable to bind.

A further object is to provide simple and efficient means for regulating the angle of the beams which carry the furrow disks.

A further object is to provide means whereby to raise the furrow disks and to so construct and arrange such means that the inner ends of the beams carrying said furrow disks will be raised faster than the outer ends.

A further object is to arrange the press wheels of a grain drill in such manner that they will be permitted to have a free movement to accommodate themselves to the unevenness of the ground.

A further object is to provide simple and efficient means for permitting the furrow disks to have a yielding action to allow them to travel over obstructions.

A further object is to produce simple and efficient devices whereby to stop the feeding mechanism of the drill automatically when the furrow disks are raised or when the drill is being turned.

A further object is to improve the general construction of a combined grain drill and disk harrow and to produce a machine of this class which shall be simple in construction, easy to operate and which shall be effectual in the performance of its functions.

A further object is to so construct a disk harrow and drill combined that the harrow part of the machine can oscillate perpendicular with the unevenness of the ground it passes over and that the drill attachment will follow the same irregularities and not bind or cramp in its rising and falling motion.

A further object is to so construct a disk harrow with drill attachment that the seed box can be straight and the feed cups and rod run on a straight line under the feed box and the delivery tubes stand at such angle as the position of the receivers on the disk harrow may demand and at the same time work free and in no way cramp.

With these objects in view the invention consists in certain novel features of construction and combinations and arrangements of parts as hereinafter set forth and pointed out in the claims.

In the accompanying drawings: Figure 1 is an end view, partly in section. Fig. 2 is a plan view. Fig. 3 is a detail view showing the attachment of the disks and the clevis for attachment of the pull bars. Fig. 4 is a detail view of the devices for raising the disk beams and disks. Fig. 5 is a detail view illustrating the means for connecting the disk beams and press wheels. Fig. 6 is a side detail view showing the attachment of the seed box to the frame of the machine. Figs. 7 and 8 are detail views.

A represents a rectangular frame made, preferably, of piping. The front bar $A^2$ of the frame A is connected loosely with the end bars $x$ by means of T-couplings $y$, so as to permit the machine to readily ride over corn hills or uneven ground, lateral movement of said T-couplings on the front bar $A^2$ being prevented by means of keys $z$.

Above the frame A, a seed box B is located and provided with feed mechanism of any approved form of construction. To each end of the seed box B, brackets $a$ are secured and each made with a curved bearing face $a'$ adapted to rest upon the ends of the frame A, said bearing faces of the brackets $a$ being preferably made semicircular in form. The brackets $a$ are each provided with perforated lugs $a^2$ projecting therefrom at diametrically opposite sides. Semicircular plates $a^3$ are placed against the ends of the frame A immediately under the brackets $a$, and said brackets and plates are clamped to the end bars of the frame by means of bails $a^4$ which embrace the plates $a^3$ and pass through the perforations in the lugs $a^2$, the ends of said bails being screw-threaded and provided with nuts $a^5$. In this manner the seed box will be clamped rigidly to the frame A, but may be adjusted thereon to bring the weight of the seed box at the proper place, or they can be removed altogether when it is desired to remove the seed box. In constructing the cover of the seed box, I prefer to secure a narrow strip $b$ thereon and hinge the lid $b'$ to said strip. By thus reducing the width of the lid it is not liable to warp and it can be made of a single piece of wood.

A series of collars $c$ are mounted on the rear bar A' of the frame and are preferably secured thereto at proper distances apart by means of set screws $c'$. A series of perforated lugs $c^2$ project from the collars $c$, and through each of these perforated lugs a stanchion C is adapted to loosely pass. The lower ends of the stanchions C are preferably curved rearwardly and enter hollow enlargements $c^4$ projecting from collars $c^5$,—which latter are mounted on the axles $c^8$ of the press wheels C'. The lower ends of the stanchions C are secured within the hollow enlargements $c^4$ by means of bolts $c^6$, and a portion of the weight of the machine will come upon keys $c^7$ which pass through the stanchions under the perforated bosses or lugs $c^2$.

The end of the tongue D of the machine which preferably projects part way through the machine, is supported by the front bar $A^2$ of the frame, and under the same, by means of a casting $d$, and below the tongue, the diagonally disposed disk beams D' will be supported in a manner which will now be explained.

Mounted on the front bar $A^2$ of the frame, preferably less than one-fourth the length of the bar from each end of the frame, are collars $e$, each having depending lugs or ears $e'$, between which depending bars E are attached by means of a bolt $e^2$. Each bar E passes downwardly through openings in the disk beams D', and through perforated plates or blocks $e^3$ secured to the tops of said disk beams. A collar $e^4$ encircles each bar E in proximity to its lower end and is retained in place by a key $e^5$ passing through said bar,—each of said collars being provided with a perforated ear $e^6$, for the reception of the inner hooked ends of draw bars E',—the forward ends of said draw bars being secured to the tongue D.

The disk beams D' carry a series of brackets F, one of such brackets for each pair of disks. One arm $f$ of the brackets is placed under the disk beam while the upright arm $f'$ of said bracket rests parallel with the front of said beam. A horizontal bolt $f^2$ passes through the arm $f'$ and the beam D' and another bolt $f^7$ passes vertically through the horizontal arm $f$ and through the beam,—said bolts serving to secure the bracket to the beam D'. At the base of each bracket is a forwardly projecting arm $f^3$ having an (preferably angular) opening $f^4$, and at the top of the arm $f'$ is a horizontal arm $f^5$ disposed parallel with the arm $f^3$ and having an (preferably angular) opening $f^6$ in alignment with the opening $f^4$ in the arm $f^3$. An upright G passes through the openings in the arms $f^3$, $f^5$ and at its lower end is secured to a boss or enlargement $g$ projecting from a sleeve $g'$ which encircles the axle of the furrow disk G'. A coiled spring $g^2$ encircles the upright G and bears at its upper end against the arm $f^5$,—the lower end of said spring bearing on a washer $g^3$ encircling the upright, and beneath this disk, a key $g^4$ is passed through a perforation in the upright just above the arm $f^3$. By this connection of the furrow disks with the disk beams, they will be permitted to yield and ride over obstructions without injury to themselves or to other parts of the machine.

To each bar or king bolt E, a clevis H is connected at a point between its ends, and each of said clevises is made with a series of perforations $h$ for the reception of one end of pull bars H'. The forward ends of the pull bars are provided with perforations $h'$ for the reception of a suitable key whereby to connect said pull bars with the clevis. At their rear ends each pair of pull bars are bifurcated for the reception of bails $i$, each having a series of perforations $i'$ corresponding in number and position with the perforations $h$ in the clevises, the rear ends of the pull bars being also provided with perforations to align with the perforations $i'$ in the bars H' for the reception of suitable pins $i^2$. The ends of each bail $i$ are bifurcated for the reception of stanchions C, to which said bails are connected by means of bolts $h^3$, at points, preferably midway between their ends. From this construction and arrangement of parts it will be seen that when the disk beams are moved at their inner ends, the clevises will be allowed to change with the disks so that the press wheels will always maintain their proper relation to the furrow disks. By providing the clevises and bails with a series of perforations the forward ends of the pull bars can be properly adjusted relatively to the press wheels so that the proper draft will be insured. By attaching the bails to the stanchions which carry the press wheels, at the centers of said stanchions, the press wheels will be permitted to have a free vertical movement,—whereas if the pull bars were to be attached to the axles of the press wheels, the operation of the machine would cause the parts to bind.

A lever I is pivotally connected to the tongue D in front of the machine and provided with a locking bar $j$ adapted to engage the teeth of a segment $j'$, also secured to the tongue. To the lower end of the lever I the forward ends of two bars $j^3$, $j^3$ are attached, the rear ends of said bars or rods being connected to the disk beams D', preferably at points in proximity to their inner ends. By the operation of the lever I the degree of the angle of the disk beams relatively to each other can be readily adjusted—said disk beams turning on the bars E as their fulcrum.

In order to raise and lower the disks, the devices now to be described will be employed. A sleeve J is loosely mounted on the rear bar A' of the frame A and provided with an arm J', at one end, to the end of which arm, a bar $J^2$ is pivotally connected, the free end of said bar being provided with a hook $k$ connected with a loop or staple $k^5$ on the tongue D. At the opposite end of the sleeve J from the arm J' is an arm $k'$, to which an operating lever K is secured, said lever being provided with a spring actuated locking bar $k^4$ adapted to pass through a perforated enlargement $k^2$ projecting from the arm $k'$, and engage a toothed segment K' projecting from a collar $k^3$ keyed to the rear bar A' of the frame A, in proximity to the end of the sleeve J. From this construction it will be seen that when the lever is moved back, the rear end of the tongue will be raised, and as the tongue bears against the under side of the front bar $A^2$ of the frame A, the front of the frame A will be raised. As the disk beams are supported from the front bar of the frame as previously explained they will also be raised when the lever K is withdrawn, carrying with them, the furrow disks. It is obvious that the forward movement of the lever K will cause the disks to be lowered.

By the operation of the lever K the disks may be raised entirely out of the ground, or their relation to the ground regulated at will. Without some means to prevent it, the outer ends of the disk beams will be raised higher than the inner ends, as said inner ends, when in working position, are disposed somewhat lower than the outer ends so as to allow the disks to fall in a dead furrow or low place in the ground, the supporting bars E of said disk beams being nearer the outer ends than the centers of the disk beams. In order that the inner ends of the disk beams shall be raised faster than the outer ends and to the same extent, the devices now to be described will be employed. A perforated lug or ear $l$ (Fig. 5) projects forwardly from the sleeve J, and has attached to it two chains (or rods) $l^2$—the forward ends of said chains or rods $l^2$ being connected to the respective disk beams. From the arm J', an arm L projects and at its free end is provided with pins or projections $l^3$, which are adapted to engage the chains or rods $l^2$. From this construction it will be seen that when the operating lever K is manipulated to turn the sleeve J to raise the disk beams, the arm L will move upwardly with the arm J', and cause the chains $l^2$ and consequently the inner ends of the disk beams to be raised at the same time that said disk beams are raised bodily in the manner above explained.

In proximity to each disk a shoe M is located and supported by bars or braces $m$, $m'$, secured at their upper ends to the disk beams D', and into these shoes, seed tubes M' are adapted to project, as shown in Fig. 1, said seed tubes communicating at their upper ends with the feed mechanism of the seed box.

Each shoe M is made elongated (in cross section) so as to permit sufficient play for the seed tube within it, to prevent binding of any of the parts when their positions are changed, and the inner faces of the shoes adjacent to the disks, are beveled or cut away to produce a broad opening next to the disk, whereby to insure the proper discharge of the seed in the furrow made by the disk,—and the lower end of the feed tube is also beveled in the same manner, as shown in Fig. 1. In this manner a very simple and efficient means will be provided for insuring the proper discharge of the grain into the furrows made by the furrow disks.

Secured at one end to the rear of the seed box and at the other end to the rear bar A' of the frame A is a frame composed of parallel bars $n$, $n$, in which a shaft N is mounted. A sprocket wheel O is keyed to the shaft N and over this sprocket wheel a sprocket chain N' passes,—said sprocket chain also passing about a sprocket wheel O' on one of the axles of the press wheels. Also mounted on the shaft N is a loose sleeve P carrying a sprocket wheel P' (preferably smaller than the sprocket wheel O) and about this sprocket wheel P' a sprocket chain $P^2$ passes and transmits motion to the feed mechanism in the seed box. A collar Q is loosely mounted on the loose sleeve P, and to this collar, a rod Q' is attached,—the other end of said rod being connected with the tongue D. One end of the hub of the sprocket wheel O is provided with clutch teeth $o$ and the adjacent end of the sleeve P is provided with clutch teeth $o'$ adapted to mesh with the clutch teeth $o$. Thus, when the machine is in operation, motion will be imparted from the axle of the press wheels to the sprocket wheel O through the chain N', thence to the sleeve P through the clutch just described, and finally to the feed mechanism in the seed box, through the sprocket wheel P' and chain $P^2$.

From the construction and arrangement of parts just described it will be seen that when the inner end of the tongue is raised, or when the machine turns around, the sleeve P will be slid on the shaft N, the clutch teeth disengaged automatically and the feed mechanism stopped. When the parts again assume their working positions, the feed mechanism will be automatically thrown into gear.

From the construction and arrangement of parts it will be seen that the drill attachments may be readily removed from the machine, and an admirable disk harrow produced.

The machine is simple in construction and effectual, in every respect, in the performance of its functions.

Numerous slight changes might be made in the details of construction of my invention without departing from the spirit thereof or limiting its scope, and hence I do not wish to limit myself to the precise details of construction herein set forth, but, Having fully described my invention, what I claim as new, and desire to secure by Letters Patent, is—

1. The combination with a frame and a disk beam supported thereby, of a bracket secured to said disk beam, said bracket having a horizontal and a vertical arm bolts passing through both of said arms and through the disk beam, a perforated arm projecting laterally from the vertical arm and a perforated arm projecting from the base of the bracket parallel with said lateral arm, an upright passing loosely through the parallel arms, disks carried by the lower end of said upright, a spring encircling said upright and bearing at its upper end against the upper lateral arm, a washer at the lower end of said spring and a key passing through the upright between said washer and lower lateral arm of the bracket, substantially as set forth.

2. The combination with a frame and a tongue, of disk beams carried by the frame, furrow disks carried by said disk beams, a sleeve mounted on the rear portion of said frame and connected with the end of the tongue, and a lever projecting from said sleeve, whereby to raise and lower the furrow disks, substantially as set forth.

3. The combination with a frame and a tongue, of disk beams supported by said frame, furrow disks carried by said disk beams, a sleeve mounted on the rear portion of the frame and connected with the tongue, a lever projecting from said sleeve, a locking bar carried by said lever, and a toothed segment keyed to the rear portion of the frame and adapted to be engaged by said locking bar, substantially as set forth.

4. The combination with a frame and a tongue, of disk beams supported by said frame, furrow disks carried by said disk beams, a sleeve carried by the rear portion of the frame, an arm projecting from said sleeve and connected with the tongue, and a lever projecting from said sleeve, substantially as set forth.

5. The combination with a frame and a tongue, of disk beams supported by said frame, furrow disks carried by the disk beams, a sleeve carried by the rear portion of the frame and connected with the end of the tongue, a flexible connection between said sleeve and the disk beams, and an arm carried by the sleeve and connected with said flexible connection, substantially as set forth.

6. The combination with a frame and a tongue, of disk beams supported by said frame, furrow disks carried by said disk beams, a sleeve carried by said frame, an arm projecting from the sleeve and connected with the tongue, a lever adapted to turn said sleeve, a flexible connection between the sleeve and the disk beams, and an arm projecting from the first-mentioned arm and connected with said flexible connection, substantially as set forth.

7. In a grain drill, the combination with a frame and a series of collars on the rear part of said frame and provided with perforated ears, of a series of stanchions passing loosely through said perforated ears, keys passing through said stanchions beneath said ears, and furrow wheels at the lower ends of said stanchions, substantially as set forth.

8. In a grain drill, the combination with a frame and a series of furrow wheels, of collars on the axles of said furrow wheels, socketed bosses projecting from said collars, and a series of stanchions curved at their lower ends and connected in said socketed bosses and loosely connected at their upper ends to the frame, substantially as set forth.

9. In a grain drill, the combination with a frame, disk beams supported thereby and disks carried by said disk beams, of a series of stanchions loosely connected with said frame, press wheels at the lower ends of said stanchions and pull bars connected at one end with the disk beams and at their other ends to the stanchions at points between the ends of the latter, substantially as set forth.

10. In a grain drill, the combination with a frame, disk beams supported thereby and furrow disks carried by said disk beams, of a series of stanchions loosely connected with said frame, press wheels at the lower ends of said stanchions and pull bars adjustably connected at one end with the disk beams and at their other ends connected with the stanchions at points between their ends, substantially as set forth.

11. In a grain drill, the combination with a frame, disk beams and furrow disks carried by said disk beams, of stanchions loosely connected with said frame, press wheels at the lower ends of said stanchions, clevises connected with the disk beams, and pull bars connected at one end with the clevises and at the other end with the stanchions, substantially as set forth.

12. In a grain drill, the combination with a frame, a series of stanchions loosely connected thereto and press wheels at the lower ends of said stanchions, of clevises, pull bars connected with said clevises, and bails connected to said pull bars and to the stanchions at points between the ends of the latter, substantially as set forth.

13. In a grain drill, the combination with a frame, of bars or bolts depending therefrom disk beams mounted on said bars, disks carried by the disk beams, clevises connected to said bolts or bars, a series of stanchions loosely connected with the frame, press wheels at the lower ends of said stanchions, bails connected to said stanchions and pull bars connecting said bails and clevises, substantially as set forth.

14. In a grain drill, the combination with a frame, a seed box, an axle wheel carried by said axle, and a tongue of a frame carried by the main frame and the seed box, a shaft mounted on said frame, a sprocket wheel having clutch teeth on its hub, carried by said sprocket wheel, a sprocket wheel carried by the axle, a sprocket chain passing about said sprocket wheels, a sleeve loosely mounted on the shaft and having clutch teeth in one end to mesh with the first-mentioned clutch teeth, a sprocket wheel carried by said sleeve and adapted to transmit motion to the feed mechanism in the seed box, a collar loosely mounted on said sleeve, and a rod connecting said collar with the tongue, substantially as and for the purpose set forth.

15. The combination with a harrow frame and furrow openers, of a seed box adjustably and removably mounted on said harrow frame, seed tubes leading from the seed box to the furrow openers and press wheels removably connected to said frame, substantially as set forth.

16. In a grain drill, the combination with a frame, a disk beam and a bar or bolt connecting the disk beam with the frame, of a clevis connected with said supporting bar or bolt and provided with a series of perforations, pull bars adjustably connected at one end with said clevis, a bail having a series of perforations for the other ends of the pull bars, the rear ends of said bail being adapted to be connected with the stanchions of press wheels, substantially as set forth.

17. The combination with the rear bar and end bars of a frame, said rear and end bars being rigidly connected together, of T-couplings secured to said end bars, a revoluble front bar mounted in said T-couplings, disk beams supported by said revoluble front bar of the frame and disks carried by said disk beams, substantially as set forth.

In testimony whereof I have signed this specification in the presence of two subscribing witnesses.

WILLIAM A. LEE.

Witnesses:
O. A. HOTT,
R. S. FERGUSON.